US009940515B2

(12) United States Patent
Callegari et al.

(10) Patent No.: US 9,940,515 B2
(45) Date of Patent: Apr. 10, 2018

(54) IMAGE ANALYSIS FOR AUTHENTICATING A PRODUCT

(71) Applicant: SICPA HOLDING SA, Prilly (CH)

(72) Inventors: Andrea Callegari, Chavannes-pres-Renens (CH); Huu Duc Christophe Pham, Prilly (CH); Yves Berthier, Metabief (FR); Gatien Chevallier, Corcelles-Cormondreche (CH); Eric Estermann, Renens (CH); Aamir Qayoom, Petit-Lancy (CH); Mathieu Gillieron, Senarclens (CH); Yves Brodard, Bulle (CH)

(73) Assignee: SICPA Holding SA, Prilly (CH)

( * ) Notice: Subject to any disclaimer, the term of this patent is extended or adjusted under 35 U.S.C. 154(b) by 0 days.

(21) Appl. No.: 15/036,536

(22) PCT Filed: Nov. 14, 2014

(86) PCT No.: PCT/EP2014/074687
§ 371 (c)(1),
(2) Date: May 13, 2016

(87) PCT Pub. No.: WO2015/071442
PCT Pub. Date: May 21, 2015

(65) Prior Publication Data
US 2016/0300107 A1 Oct. 13, 2016

Related U.S. Application Data

(60) Provisional application No. 61/904,649, filed on Nov. 15, 2013.

(30) Foreign Application Priority Data

Nov. 14, 2013 (WO) .................. PCT/EP2013/073889

(51) Int. Cl.
*G06K 9/00* (2006.01)
*G06K 9/20* (2006.01)
(Continued)

(52) U.S. Cl.
CPC .......... *G06K 9/00577* (2013.01); *G06K 9/20* (2013.01); *G06K 9/2054* (2013.01);
(Continued)

(58) Field of Classification Search
CPC ............ G06K 9/00577; G06K 9/6202; G06K 9/2054; G06K 9/4642; G06K 9/4671;
(Continued)

(56) References Cited

U.S. PATENT DOCUMENTS

2009/0028424 A1 1/2009 Satoshi et al.
2009/0141984 A1 6/2009 Akira et al.
(Continued)

FOREIGN PATENT DOCUMENTS

EP 1143375 10/2001

*Primary Examiner* — Ruiping Li
(74) *Attorney, Agent, or Firm* — Muncy, Geissler, Olds & Lowe, PC

(57) ABSTRACT

A method of authenticating a product by taking an image of the product and comparing the image with a reference image of a genuine product taken previously to determine if the products in the two images are the same. The two images are captured under substantially similar conditions so that the two images are as similar as possible prior to the comparison. The two images are processed in order to calculate for each of them a list of significant points. The significant points are compared to determine a degree of correspondence between the significant points. An answer is output indicating the authenticity of the product based on the degree of correspondence. Some of the matching significant points may be used to define a common coordinate system
(Continued)

for the two images. The two lists of significant points may be compared in this common coordinate system.

14 Claims, 25 Drawing Sheets

(51) Int. Cl.
*G06K 9/62* (2006.01)
*G06Q 30/00* (2012.01)
*G06T 7/38* (2017.01)
*G06T 7/11* (2017.01)

(52) U.S. Cl.
CPC .......... *G06K 9/6202* (2013.01); *G06K 9/6211* (2013.01); *G06Q 30/0185* (2013.01); *G06T 7/11* (2017.01); *G06T 7/38* (2017.01); *G06K 2009/0059* (2013.01); *G06K 2009/6213* (2013.01); *G06K 2209/03* (2013.01)

(58) Field of Classification Search
CPC ....... G06T 7/0081; G06T 7/0038; G06T 7/33; G06T 2207/20021; G06T 2207/10012
USPC ......................................................... 382/218
See application file for complete search history.

(56) References Cited

U.S. PATENT DOCUMENTS

| | | |
|---|---|---|
| 2012/0076422 A1 | 3/2012 | Lei et al. |
| 2013/0004079 A1 | 1/2013 | Hitoshi et al. |

IMAGE ANALYSIS FOR AUTHENTICATING A PRODUCT

CROSS-REFERENCE TO RELATED APPLICATIONS

The present application is a National Stage Application of International Application No. PCT/EP2014/074687 filed Nov. 14, 2014, which published as WO 2015/071442 A1 on May 21, 2015, the disclosures of which are expressly incorporated by reference herein in their entireties. Further, the present application claims the benefit of U.S. Provisional Application No. 61/904,649 filed Nov. 15, 2013, and claims priority to International Application No. PCT/EP2013/073889 filed Nov. 14, 2013, the disclosures of which are expressly incorporated by reference herein in their entireties.

BACKGROUND OF THE DISCLOSURE

1. Field of the Disclosure

The present disclosure relates to image analysis for authenticating a product.

2. Background Description

Watches and other valuable objects, such as luxury or technical objects, are routinely counterfeited. Thus, there is a need to have a method for distinguishing between genuine and non-genuine products.

In many cases it is not possible or desirable to change the appearance or the functionality of the object. Therefore, marking or tagging the object is not a viable option.

SUMMARY OF THE EMBODIMENTS OF THE DISCLOSURE

In accordance with a first aspect of this disclosure, there is provided a method of authenticating a product, comprising:
  capturing an image of a product to be authenticated;
  determining a plurality of significant points of the captured image; and
  comparing the plurality of significant points of the captured image of the product to be authenticated with a plurality of significant points of a previously captured reference image of a genuine product to determine if the product to be authenticated is the same as the genuine product for authenticating the product.

Images of watches and other products are complex and information-rich. An advantage of comparing the significant points between two images over comparing the raw image data is that it provides a practical way of comparing the images that requires a lesser processing demand.

During the comparison it is important to discriminate between relevant differences, i.e., differences between the two images that are indicative of non-genuineness and non-relevant differences, i.e., differences between the two images that do not indicate non-genuineness and which arise from the imperfect control of measurement conditions, for example, noise and natural changes of the object that occur with time, such as, wear and aging. This is particularly true for complex objects, which may contain moving parts that may change position, orientation, and/or shape from one moment to another.

The relevant differences between the two images often correspond to minute (or small) details, which may be matched between two measurements without human assistance.

The definition and the calculation of significant points may be based on algorithms that extract the most relevant information, and the most robust to image degradation, such as noise, distortion, and imperfect measurement conditions. Thus, only the most significant portion of the information contained in the two images is further processed and used.

In addition, non-relevant differences have a limited impact on the features of the calculated significant points and, in many cases, the most affected points may be detected and discarded, for example, points that have moved substantially because they are associated with mobile elements, such as watch hands.

The algorithms used for the calculation of significant points do not require human assistance. The algorithms may require human assistance to input a basic parameterization for the product being authenticated. A particular set of parameters may be valid for a particular type of product, such as watches. One algorithm and one set of parameters may be used for a large class of objects, such as watches of a particular model, shape, colour, etc.

The information for analysis may be densely distributed over a significant fraction of the image (as opposed to concentrated at a particular location) so authentication may be performed even when only a portion of the image is available. It may be desirable to define one or more regions of interest that are considered especially relevant, and which may be selectively analysed.

The method may further comprise aligning a plurality of significant points of the image of the product to be authenticated with a plurality of significant points of the image of the genuine product prior to comparing the significant points.

The plurality of significant points that are used in the aligning step may be different to the plurality of significant points that are used in the comparing step.

The plurality of significant points that are used in the aligning step may be the same as the plurality of significant points that are used in the comparing step.

Aligning the significant points may comprise determining two or more matching pairs between the plurality of significant points of the image of the product to be authenticated and the plurality of significant points of the image of the genuine product.

Each of the significant points of the image of the product to be authenticated and the significant points of the image of the genuine product may comprise a descriptor, and wherein determining two or more matching pairs comprises comparing the descriptors of the plurality of significant points of the image of the product to be authenticated and the plurality of significant points of the image of the genuine product.

Comparing the descriptors may comprise determining a distance, such as a Euclidean distance, of a descriptor of a significant point of the image of the product to be authenticated and a descriptor of a significant point of the image of the genuine product. A significant point of the image of the product to be authenticated may be considered to match a significant point of the image of the genuine product when their distance satisfies a predetermined criterion.

The product to be authenticated and the genuine product may be located in a similar position in the images from which the significant points are calculated. Determining two or more matching pairs may comprise comparing significant points that have co-ordinates that satisfy a predetermined criterion, for example co-ordinates that are within a similar relative region of their respective image, for example co-ordinates that are within between 5 mm and 10 mm of each other before alignment.

Aligning the plurality of significant points of the image of the product to be authenticated and the plurality of significant points of the image of the genuine product may comprise using the two or more matching pairs to determine a transformation for aligning the significant points.

Using the two or more matching pairs to determine the transformation may comprise minimising a root-mean-square (rms) distance between the location of the significant points of the matching pairs.

The method may further comprise applying the transformation to all of the plurality of significant points of the image of the product to be authenticated or to all of the plurality of significant points of the image of the genuine product to align the significant points.

The method may further comprise dividing the image of the product to be authenticated into a plurality of sub-regions, and aligning the plurality of significant points of the image of the product to be authenticated and the plurality of significant points of the reference image of the genuine product separately for the sub-regions. This may allow the significant points to be aligned more accurately within a sub-region.

Dividing the image of the product to be authenticated into a plurality of sub-regions may comprise applying a grid of dividing boundaries, preferably a grid of dividing orthogonal boundaries, to the image of the product to thereby define the sub-regions.

The image of the product may be divided into between 50 and 150 sub-regions, preferably into between 80 and 120 sub-regions, and preferably into 100 sub-regions.

The step of determining the plurality of significant points of the image of the product to be authenticated may comprise determining the plurality of significant points separately for the sub-regions after the sub-regions have been determined.

The method may comprise determining a plurality of significant points of the image of the product to be authenticated prior to determining the sub-regions for assisting the determination of the sub-regions.

Comparing the plurality of significant points of the image of the product to be authenticated with the plurality of significant points of the image of the genuine product may comprise determining if a significant point of the plurality of significant points of the image of the product to be authenticated is within a defined distance of a significant point of the plurality of significant points of the image of the genuine product.

The defined distance may be between one and two times the distance corresponding to one image pixel, for example between 25 μm and 50 μm.

Comparing the plurality of significant points of the image of the product to be authenticated with the plurality of significant points of the image of the genuine product may comprise determining if a significant point of the plurality of significant points of the image of the product to be authenticated is within a defined distance of a significant point of the plurality of significant points of the image of the genuine product for at least some of the significant points of the image of the product to be authenticated or for at least some of the significant points of the image of the genuine product within a region of the image. The region of the image may be the entire image of the product. The region of the image may be a select region of interest of the image, for example a logo on the product. The region of the image may be one of the sub-portions of the image. The region of the image may be the region of the image for which significant points are calculated.

Comparing the plurality of significant points of the image of the product to be authenticated with the plurality of significant points of the image of the genuine product may comprise determining if a significant point of the plurality of significant points of the image of the product to be authenticated is within a defined distance of a significant point of the plurality of significant points of the image of the genuine product for select significant points of the image of the product to be authenticated or for select significant points of the image of the genuine product within a region of the image. The region of the image may be the entire image of the product. The region of the image may be a select region of interest of the image, for example a logo on the product. The region of the image may be one of the sub-portions of the image. The region of the image may be the region of the image for which significant points are calculated.

The method may further comprise determining a sum of the number of significant points of the image of the product to be authenticated which are within the defined distance of a significant point of the image of the genuine product within the region of the image.

The method may further comprise applying a function to the sum to determine an output for comparison with a threshold value to determine the authenticity of the product.

The function may comprise dividing the sum by the total number of significant points of the image of the product to be authenticated within the region of the image or by the total number of significant points of the image of the genuine product within the region of the image to determine a ratio.

The method may further comprise comparing the ratio with a threshold ratio to determine the authenticity of the product.

The threshold ratio may be between 20% and 50%, and preferably between 20% and 40%, and preferably between 20% and 30%.

The image of the product to be authenticated may have substantially similar production criteria to the image of the genuine product. Substantially similar production criteria may mean one or more of: that the image of the product to be authenticated is captured under the same lighting conditions as the image of the genuine product; that the images are captured using a camera having the same image capture settings and lens specification; that the images are captured using substantially similar apparatus; and that the product is placed in substantially the same orientation in the two images.

The product may be a timepiece, for example a watch. The product may be a mobile telephone. The product may be jewellery. The product may be a spare part. The product may be a battery, for example a mobile phone battery. The product maybe a microprocessor or a printed circuit board. The product may be software and, for example, the software packaging may comprise a printed region with distinctive characteristics that can be imaged and analysed for authenticating the software. The product may be a label that is affixed to another product, wherein the label has distinctive characteristics that can be imaged and analysed for authenticating or confirming the identity of the object or product to which the label is affixed. The product may be a certificate, for example a driving licence or a university certificate confirming a candidate's grades. The product may be a coin. The product may be a painting. The product maybe also a natural or a non-natural product having inherent disorders or a fingerprint or random distribution of elements. Example of natural product may be the skin of reptile, for example (crocodile, python skin) or the section of a tree trunk, or a non-natural product may be a spare part, such as a brake, a wing of an aircraft. The product will be analyzed according to the method of the present disclosure, in its entirely or only a part or section of the product will be analyzed according to the method of the present disclosure.

The method of authenticating a product, for example a timepiece, may further comprise using the image in performing the method of authenticating the product described herein, or sending the image to a remote location for analysis with the method described herein.

The image may be a first image, and the method may further comprise capturing a second image of the product for creating a composite image based on the first image and the second image for comparison with a reference image of a genuine product for authenticating the product.

The step of capturing the first image of the product may be carried out when the product is illuminated from a first direction and the step of capturing the second image of the product may be carried out when the product is illuminated from a second direction, wherein the second direction is different to the first direction.

Illumination from the first direction may illuminate the imaged surface of the product from the opposite side of the product to illumination from the second direction. Illumination from the first direction may illuminate the imaged surface of the product from the opposite side of an optical axis of a lens of a camera that captures the images of the product to illumination from the second direction.

The method may further comprise capturing a third image of the product when the product is illuminated from a third direction, and capturing a fourth image of the product when the product is illuminated from a fourth direction for creating a composite image based on the first, second, third, and fourth images for comparison with a reference image of a genuine product for authenticating the product.

Illumination from the third direction may illuminate the imaged surface of the product from the opposite side of the product to illumination from the fourth direction, and wherein illumination from the first, second, third, and fourth directions illuminates the imaged surface of the product from four different sides of the product. The first, second, third, and fourth directions may be spaced evenly around the product.

Illumination from the third direction may illuminate the imaged surface of the product from the opposite side of an optical axis of the lens of the camera that captures the images of the product to illumination from the fourth direction. Illumination from the first, second, third, and fourth directions may illuminate the imaged surface of the product from four different sides of the optical axis. The first, second, third, and fourth directions may be spaced evenly around the optical axis.

The step of capturing the first image may be carried out at a first exposure time, and the step of capturing the second image may be carried out at a second exposure time, wherein the first exposure time is different to the second exposure time.

Creating the composite image may comprise subtracting data pertaining to the first image from data pertaining to the second image, or adding data pertaining to the first image to data pertaining to the second image.

The method may further comprise receiving imaging instructions comprising the conditions for capturing the image or images of the product to be authenticated, and capturing the image or images of the product according to the instructions.

The imaging instructions may convey substantially similar or the same conditions under which the reference image or images of a genuine product were captured at an earlier point in time so that the product to be authenticated may be imaged under substantially similar or the same conditions as the genuine product. The conditions may comprise one or more of: lighting conditions; image capture settings for the camera; focal length for the camera lens; number of images to be captured; and exposure time for the camera.

The method may further comprise outputting an answer indicating the authenticity of the product based on the degree of correspondence. Outputting the answer may comprise displaying the answer to a user on a screen, for example, on a computer screen. Outputting the answer may comprise providing a printed copy of the answer to a user, for example, printing the answer on an authentication certificate for the product.

In accordance with a further aspect of this disclosure, there is provided a computer program comprising executable instructions for execution on a computer, wherein the executable instructions are executable to perform the method described herein.

In accordance with a further aspect of this disclosure, there is provided a product authentication device for capturing an image of the product for authenticating the product, comprising a support for supporting the product to be authenticated; and a first illuminator for illuminating the product from a first direction.

The product authentication device may further comprise a second illuminator for illuminating the product from a second direction.

The first and the second illuminators may be configured so that in use illumination from the first direction illuminates the imaged surface of the product from the opposite side of the product to illumination from the second direction.

The product authentication device may further comprise a third illuminator for illumination the product from a third direction.

The product authentication device may further comprise a fourth illuminator for illuminating the product from a fourth direction.

The first, second, third, and fourth illuminators may be configured so that in use illumination from the third direction illuminates the imaged surface of the product from the opposite side of the product to illumination from the fourth direction, and wherein illumination from the first, second, third, and fourth directions illuminates the imaged surface of the product from four different sides of the product. The first, second, third, and fourth directions may be spaced evenly around the product.

The product authentication device may further comprise a camera for capturing an image of the product.

The support may comprise an aligner for locating the product in a predetermined location for capturing an image of the product. The product authentication device may comprise a camera support for fixing the camera in position relative to the predetermined location, whereby the optical axis of the lens of the camera is fixed in position relative to the predetermined location. The first and the second illuminators may be configured so that in use illumination from the first direction may illuminate the imaged surface of the product from the opposite side of the optical axis of the lens of the camera that captures the images of the product to illumination from the second direction. The third and fourth illuminators may be configured so that in use illumination from the third direction may illuminate the imaged surface of the product from the opposite side of the optical axis of the lens of the camera that captures the images of the product to illumination from the fourth direction. The first, second, third, and fourth illuminators may be configured so that in use illumination from the first, second, third, and fourth directions may illuminate the imaged surface of the product from four different sides of the optical axis. The first, second, third, and fourth directions may be spaced evenly around the optical axis.

The product authentication device may further comprise a holder for holding the product in the predetermined location.

The holder may comprise a spring-biased arm for pushing the product against the aligner to hold the product in the predetermined location. Alternatively, the product authentication device may comprise two or more spring-biased arms which exert a force on opposing sides of the product to hold the product in a predetermined position.

The product authentication device may further comprise a cover for protecting the product from ambient light during image capture.

The product authentication device may further comprise a computer for analysing images of the product, and preferably wherein the computer analyses the images using the method described herein.

In accordance with a further aspect of this disclosure, there is provided a method of creating a reference for authenticating a product comprising capturing an image of at least part of the product; and storing the image as a reference, preferably storing the image in a database, for authenticating the product.

The image may be a first image and the method may further comprise capturing a second image of at least part of the product, and storing the second image as a reference for authenticating the product.

In accordance with a further aspect of this disclosure, there is provided an image file containing reference data for authenticating a product, wherein the reference data comprises a plurality of significant points of an image of at least part of a product.

In accordance with a further aspect of this disclosure, there is provided a database containing reference data for authenticating two or more products, wherein the reference data comprises data pertaining to an image of at least part of a first product, and data pertaining to an image of at least part of a second product. Each significant point may comprise a radius (r), an orientation (($\theta$)), a descriptor (D), and its co-ordinates. The method may comprise determining a descriptor for one or more of the significant points of the image. The descriptor may comprise an array of data corresponding to a mathematical description of the corresponding image region. For the purpose of explaining its further use, a descriptor may be thought of as a vector in an abstract vector space with dimensions equal to the size of the array.

BRIEF DESCRIPTION OF THE DRAWINGS

Other advantages and features of the disclosure will become apparent from studying the detailed description of a few exemplary implementations and embodiments, which are no way limiting, and the appended drawings, in which:

FIGS. 3A to 3D show four images of the same object illuminated from different sides of the product, referred to as North, East, South, and West wherein FIG. 3A shows the object illuminated from the West side, FIG. 3B shows the object illuminated from the East side, FIG. 3C shows the object illuminated from the North side, and FIG. 3D shows the object illuminated from the South side;

FIGS. 4A to 4C show composite images, wherein FIG. 4A is the difference between the images of FIGS. 3A and 3B, FIG. 4B is the difference between the images of FIGS. 3C and 3D, and FIG. 4C is the sum of the images of FIGS. 4A and 4B;

FIG. 5A and FIG. 5B show different images of the same object, wherein FIG. 5A shows a reference image for the object and FIG. 5B shows an image for comparison with the reference image;

FIGS. 6A and 6B are visual representations of significant points, wherein FIG. 6A shows significant points detected on the whole region of interest of the object, the points being marked with a small black cross, and showing an example of a grid applied to the time piece, and FIG. 6B is a zoomed in view showing part of the image of FIG. 6A, the significant points being marked with a circle centred on the point and the radius of the circle showing the size of the corresponding feature and its orientation;

FIGS. 8A to 8D show significant points and matches of significant points for a reference image and for a check image to be compared with the reference image, wherein FIG. 8A shows significant points determined for the reference image, the significant points being marked with a small black cross, FIG. 8B shows significant points determined for the check image, FIG. 8C shows the significant points of the reference image that match with significant points of the check image, and FIG. 8D shows the significant points of the check image that match with significant points of the reference image;

FIGS. 11A to 11D show significant points and significant points that are closer than two pixels for a reference image and for a check image to be compared with the reference image after the significant points have been referred to a common co-ordinate system, wherein FIG. 11A shows the significant points determined for the reference image, FIG. 11B shows the significant points determined for the check image, FIG. 11C shows the significant points of the reference image that are closer than two pixels to a significant point of the check image in the common co-ordinate system, and FIG. 11D shows the significant points of the check image that are closer than two pixels to a significant point of the reference image in the common co-ordinate system; and FIG. 12A to 12D illustrate zoomed in versions of part of the images shown in FIGS. 11A to 11D, wherein FIG. 12A shows part of FIG. 11A, FIG. 12B shows part of FIG. 11B, FIG. 12C shows part of FIG. 11C, and FIG. 12D shows part of FIG. 11D.

DETAILED DESCRIPTION OF EMBODIMENTS OF THE DISCLOSURE

In the following sections detailed descriptions of embodiments of the disclosure are given. The description of both preferred and alternative embodiments are exemplary embodiments only, and it is understood that variations, modifications and alterations may be apparent. It is therefore to be understood that said exemplary embodiments do not limit the broadness of aspects of the underlying disclosure.

An image, or a plurality of images, of a product to be authenticated are taken for authenticating the product. The plurality of images of the product may be combined to produce a single image of the product. The image of the product is then compared with an image of a genuine product taken previously, herein referred to as a reference image, to determine if the products in the two images are the same, and hence, if the product is authentic. The image of the product which is compared with the reference image is herein referred to as a check image. The check image is captured under the same (or substantially similar) conditions to the reference image, for example under substantially similar lighting conditions, so that the images to be compared are as similar as possible. The product may be located at substantially the same position in the check image as in the reference image. The product may be imaged using a lens of the same focal length so that the two images to be compared are as similar as possible. The method advantageously allows subtle differences between the products to be detected.

The images may be captured with analogue photography, using a camera and film, or preferably the images are captured with a digital camera, at a resolution where the details of the object used for authentication purpose are visible. The images may be colour images or black and white grayscale images.

Figure 1:
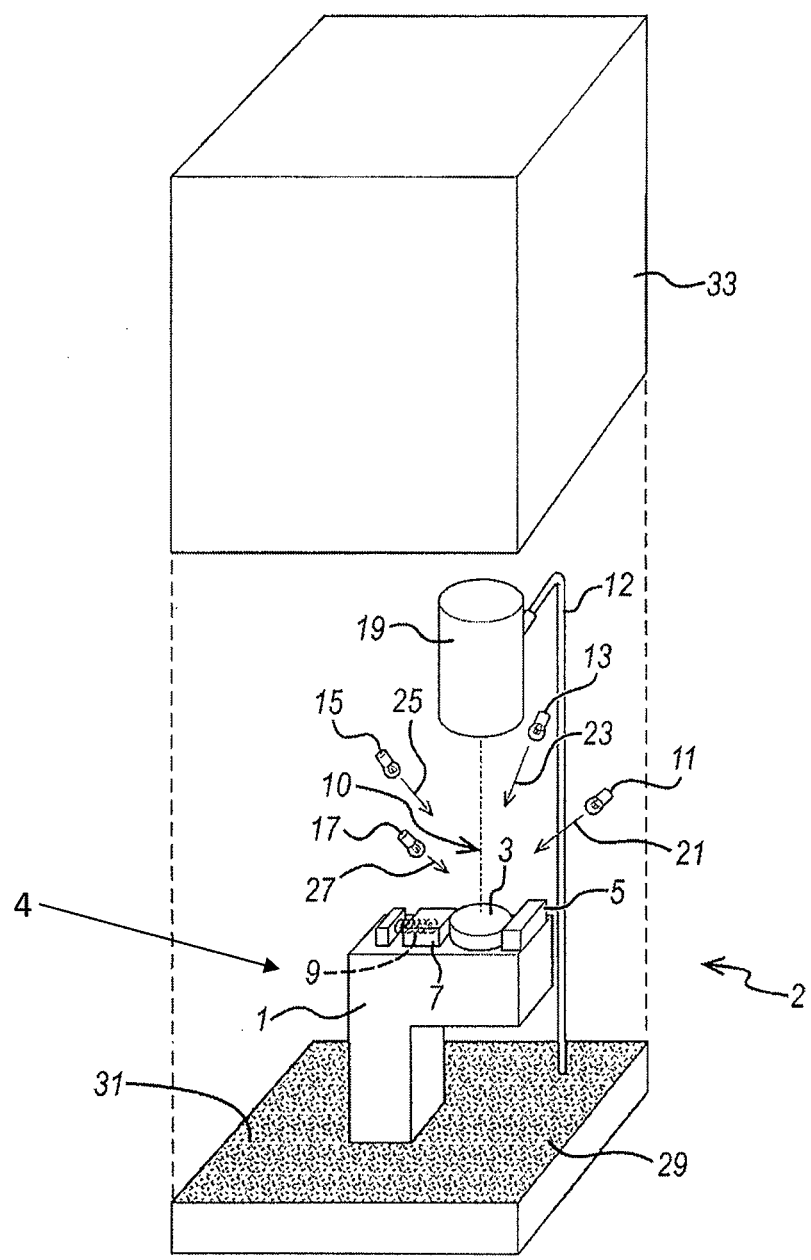
FIG. 1 shows an apparatus for imaging a product for authentication.

An apparatus or imaging apparatus 2 for capturing a check image and a reference image of the product is shown in FIG. 1. The apparatus 2 comprises a support 1 for supporting the product 3. The support comprises an aligner 5 for locating the product 3 in a predetermined position or location. The product 3 can therefore be located in a set position relative to the camera 19 and/or the illuminators 11, 13, 15, 17. The apparatus 2 comprises a holder 4 for holding the product 3 in the predetermined position. The holder 4 may comprise an arm 7 that is biased with a spring 9 to push the product 3 against the aligner 5 to hold the product 3 in the predetermined position. The aligner 5 provides a reference surface against which the product 3 is pushed by the arm 7. This ensures that the product 3 is in substantially the same position in the reference image and in the check image.

Figure 2:
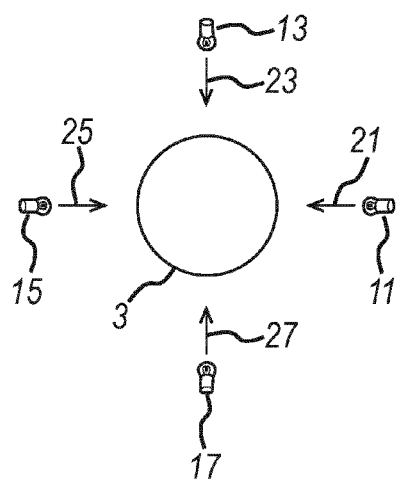
FIG. 2 shows a top view of details of the arrangement of the illuminators from FIG. 1 as they illuminate the product from different sides of the product.

The apparatus 2 comprises a camera 19 for capturing one or more images of the product 3. Four illuminators 11, 13, 15, 17 are provided, each of which emits light in an illumination direction 21, 23, 25, 27. The illuminators 11, 13, 15, 17 are arranged to illuminate the imaged surface of the product 3 from different sides of the product 3. The first illuminator 11 emits light in a first direction 21. The second illuminator 15 emits light in a second direction 25. The third illuminator 13 emits light in a third direction 23. The fourth illuminator 17 emits light in a fourth direction 27. The illuminators 11, 13, 15, 17 are arranged to illuminate the product 3 from different sides of the product 3 so that multiple images of the same or a substantially similar part of the product 3 can be captured under different lighting conditions for creating a composite image of the product 3. The illuminators 11, 13, 15, 17 are preferably identical. The illuminators 11, 13, 15, 17 are preferably arranged such that their illumination directions 21, 23, 25, 27 are axially symmetric with respect to the optical axis 10 of the camera 19. When four illumination directions are used, this axial symmetry results in the projections of the illuminators on the focal plane being mutually orthogonal, as seen in FIG. 2.

More generally, a number n of illuminators can be used, which are preferably identical and arranged such that their illumination directions are axially symmetric with respect to the optical axis 10 of the camera 19, in which case, the projections of the respective illuminators on the focal plane form an angle of 360/n degrees ($2\pi/n$ radians). The number n is preferably even (n=2, 4, 6, . . . ).

The support 1 is mounted on a platform 29. The platform preferably has a light absorbing upper surface 31, which, for example, may be black. A cover 33 is provided. The cover 33 is mounted over the support 1 and engages the platform 29 to encase the camera 19, the illuminators 11, 13, 15, 17, and the product 3. The cover 33 is hollow inside and its inner walls absorb light. The inner walls of the cover 33 may be black. The cover 33 and the platform 29 together enclose the camera 19, the illuminators 11, 13, 15, 17, and the product 3 on all sides and above and below, and prevent ambient light from entering the lens of the camera 19. As such, in accordance with aspects of the disclosure, the imaging conditions can be controlled to a high degree since ambient light cannot create differences between two images.

In embodiments, the camera 19 may be mounted on the cover 33 or on the platform 29 using a camera support 12. In FIG. 1, the camera support 12 mounts the camera 19 to the platform 29. The camera support 12 enables the camera 19 to be fixed in position relative to the predetermined location in which the product 3 is located when it is imaged. The camera 19 can be fixed in position above the product 3. The optical axis 10 of the lens of the camera 19 can therefore be fixed in position relative to the predetermined location. The illuminators 11, 13, 15, 17 may be mounted on the cover 33 or on the platform 29. In one example, the camera 19 and three of the illuminators are mounted on the platform 29. One of the illuminators is mounted on the cover 33.

The apparatus may comprise a computer for receiving the image data captured by the camera 19. The computer may be configured to perform the comparison of the captured image with a reference image for authenticating the product, as described further herein. Alternatively or additionally, the computer may be configured to send the captured image for analysis at a server at a remote location.

When capturing the image of the genuine product to collect reference data against which the product can be later authenticated, the genuine product is first positioned on the support 1. The camera parameters, such as focal length, exposure time and resolution, are set. System parameters, such as the colour of the illuminators 11, 13, 15, 17, and intensity of the illuminators 11, 13, 15, 17 are set. A reference image is then captured. The image quality may be validated. The raw data may then be sent to a server for storing and/or processing, wherein the server may be located remotely from the imaging apparatus 2. The server may be a central server to which multiple imaging apparatus 2 may be connected so that the data is centrally stored and processed. Optionally, the server determines the significant points for the reference image and stores the significant points as a reference. Alternatively or additionally the significant points are determined at a later point in time when a product is being authenticated.

The server may store the data for the reference image in a database. The reference image data may be stored against a product identifier, such as a serial code for the identifying the product 3. The reference image data thus provides a unique reference for authenticating the product 3 at a later point or points in time.

The data sent to the server for storing may comprise event data. Event data may comprise data conveying the time, location, operator identity, date and/or imaging conditions under which the reference image was taken. The server may send a confirmation to the imaging apparatus 2 to confirm that the image data and the event data have been received.

To authenticate a product, an image of the product to be authenticated is taken for comparison with the reference image, using the apparatus 2. The product 3 to be authenticated is positioned on the support 1. The camera and system parameters are set. The server may convey the camera and system parameters to the imaging apparatus 2 so that the image or images of the product 3 can be taken under the same camera and system parameters to those used to capture the reference image or images.

The check image of the product is taken. The image quality may be validated.

Event data may additionally be sent to the server for storing. Event data may comprise data conveying the time, location, date, operator identity, and/or imaging conditions under which the check image was taken. The server may send a confirmation to the imaging apparatus 2 to confirm that the image data and the event data have been received.

Significant points are then computed for the check image. If not already calculated, the significant points are then calculated for the reference image. Calculation and comparison of the significant points of the check image and the reference image is described in more detail below. Calculation and comparison of the significant points may be performed by the remote server or may be performed by a computer local to the imaging apparatus 2. If the calculation and comparison of the significant points is performed by the remote server, then the authentication result of the data processing, for example authentic or non-authentic, may be transmitted from the remote server to a computer at the same location as the imaging apparatus 2 so that an operator at the location of the imaging apparatus 2 can be informed of the result.

To compare the images, the method involves determining significant points of the check image and comparing these points with significant points of the reference image. The image of the product to be authenticated is taken under substantially the same conditions as the image of the genuine product. Each image may be processed in the same way before the significant points are determined. For example, a composite image may be produced from a plurality of images of the product to be authenticated and compared with a composite image produced from a plurality of images of the genuine product. The composite image of the product to be authenticated may be produced in the same way as the composite image of the genuine product. Significant points may be determined for each of the composite images and compared.

A composite image results from the combination of two or more images of the product, each image corresponding to a different set of measurement parameters, such as camera position, exposure time, illumination and/or filtering. An example of a composite image would be a High Dynamic Range Image (HDR) obtained by combining several images taken with different exposure times. Another example of a composite image would be a differential image obtained by taking the difference of two images where the illumination does not come from the same direction. Another example of a composite image would be a stereoscopic picture. Another example of a composite image would be the juxtaposition of two or more pictures each containing a portion of the object.

The composite image may be obtained by combining images taken with different exposure times and/or with different directions of illumination.

Figure 3A:
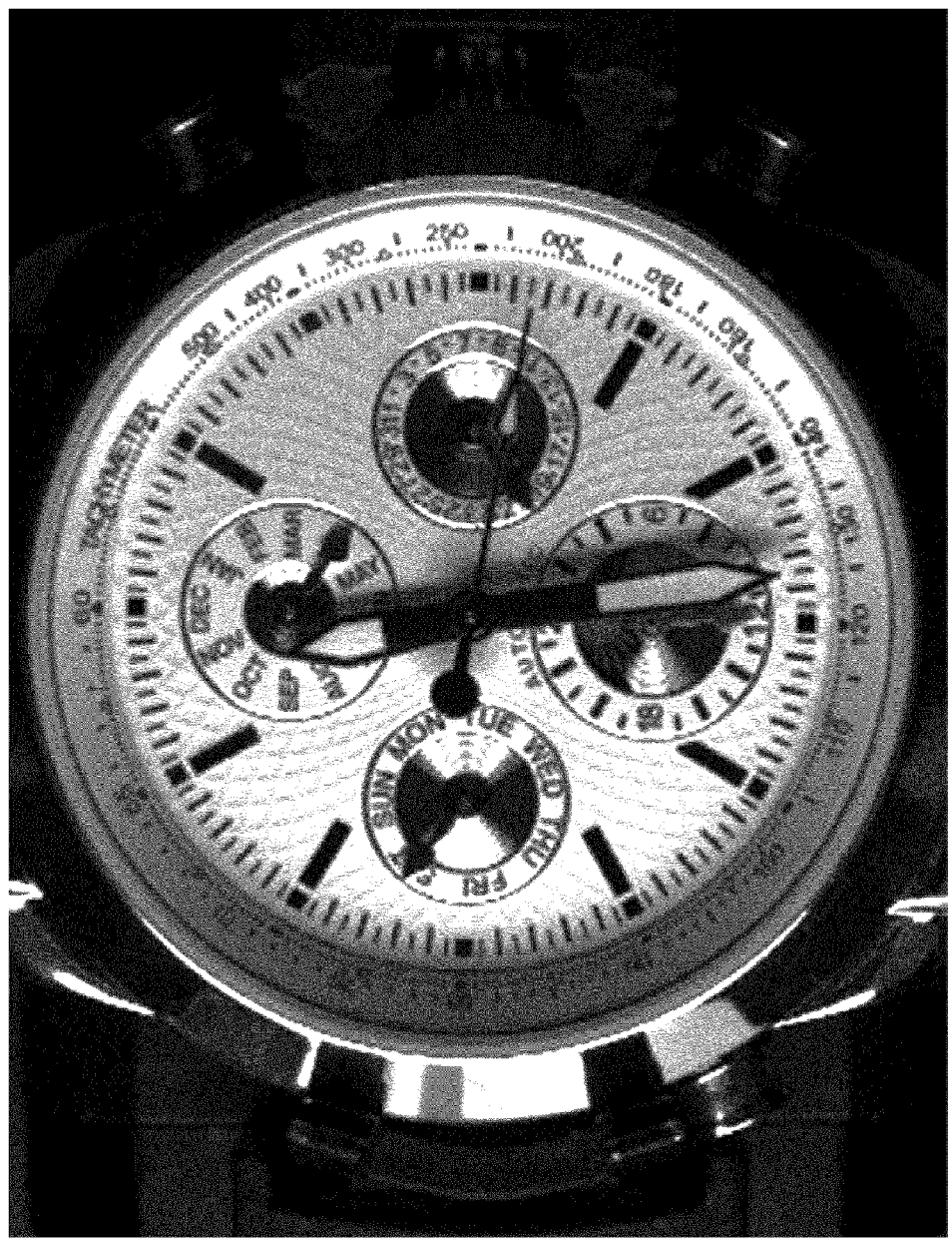
Figure 3B:
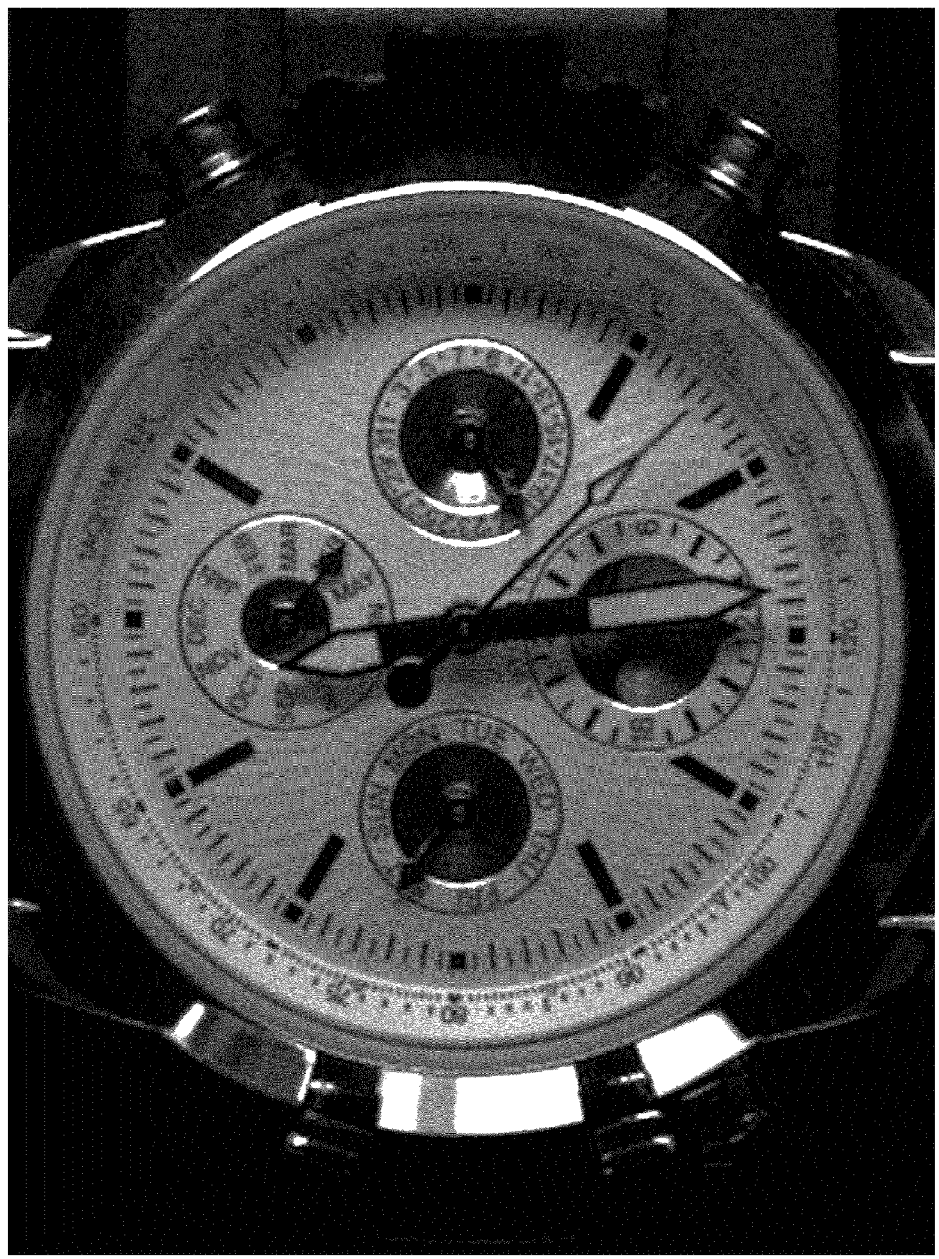
Figure 3C:
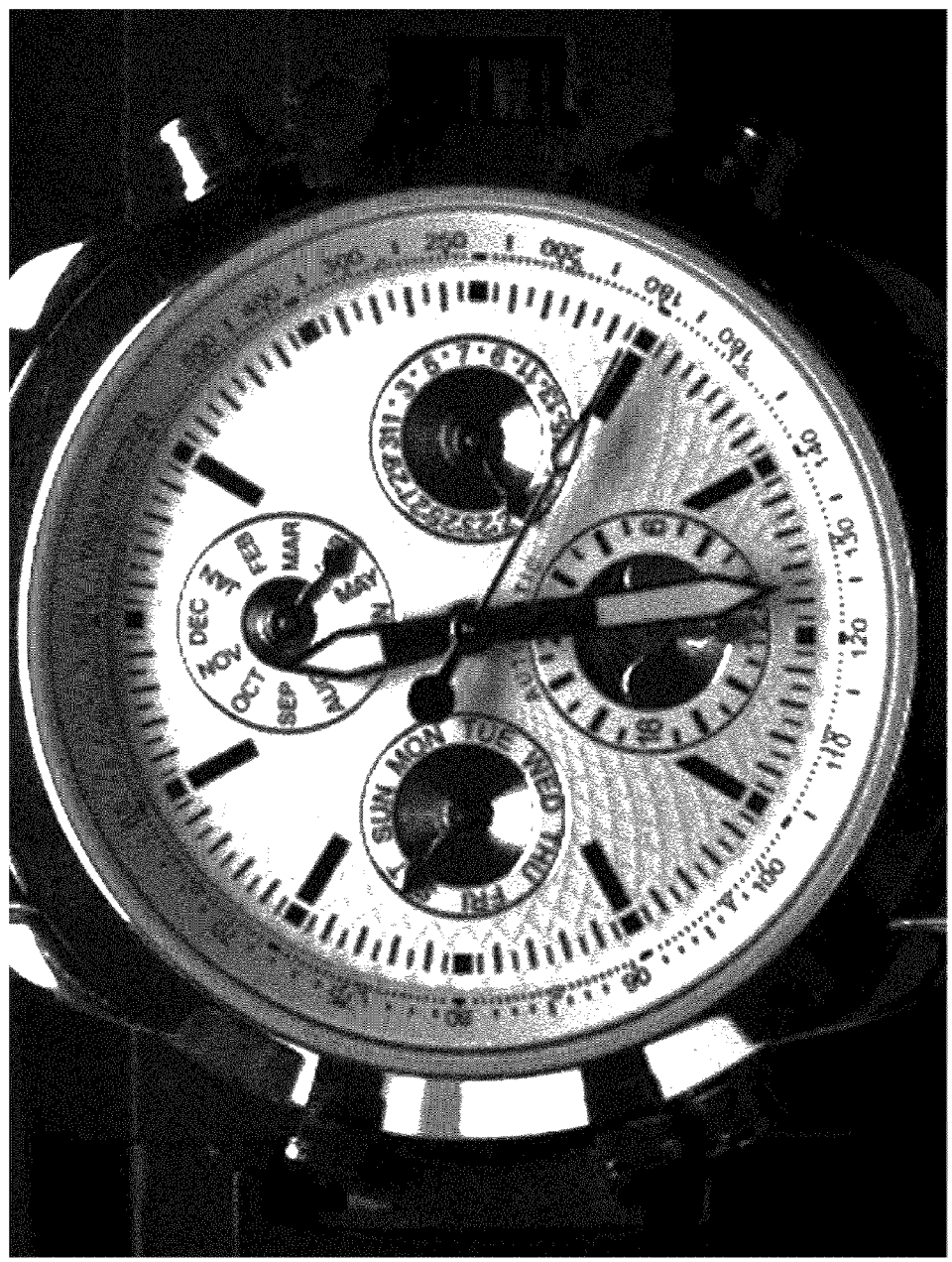

FIGS. 3A to 3D show four images of the same object, in this case a watch, illuminated from four different directions and obtained by the imaging apparatus of FIG. 1. In FIG. 3A, the object is illuminated by the second illuminator 15 and in FIG. 3B the object is illuminated by the first illuminator 11, in order to enhance the details of the three dimensional structure of the object and of its surface. In FIG. 3C, the object is illuminated by the third illuminator 13 and in FIG. 3D the object is illuminated by the fourth illuminator 17. The four images are then used to create a composite image for comparison with another image. Creating a composite image for comparison is especially helpful for relatively flat product surfaces to increase the number of points of interest which can be detected and analysed.

Figure 3D:
Figure 4A:
Figure 4B:
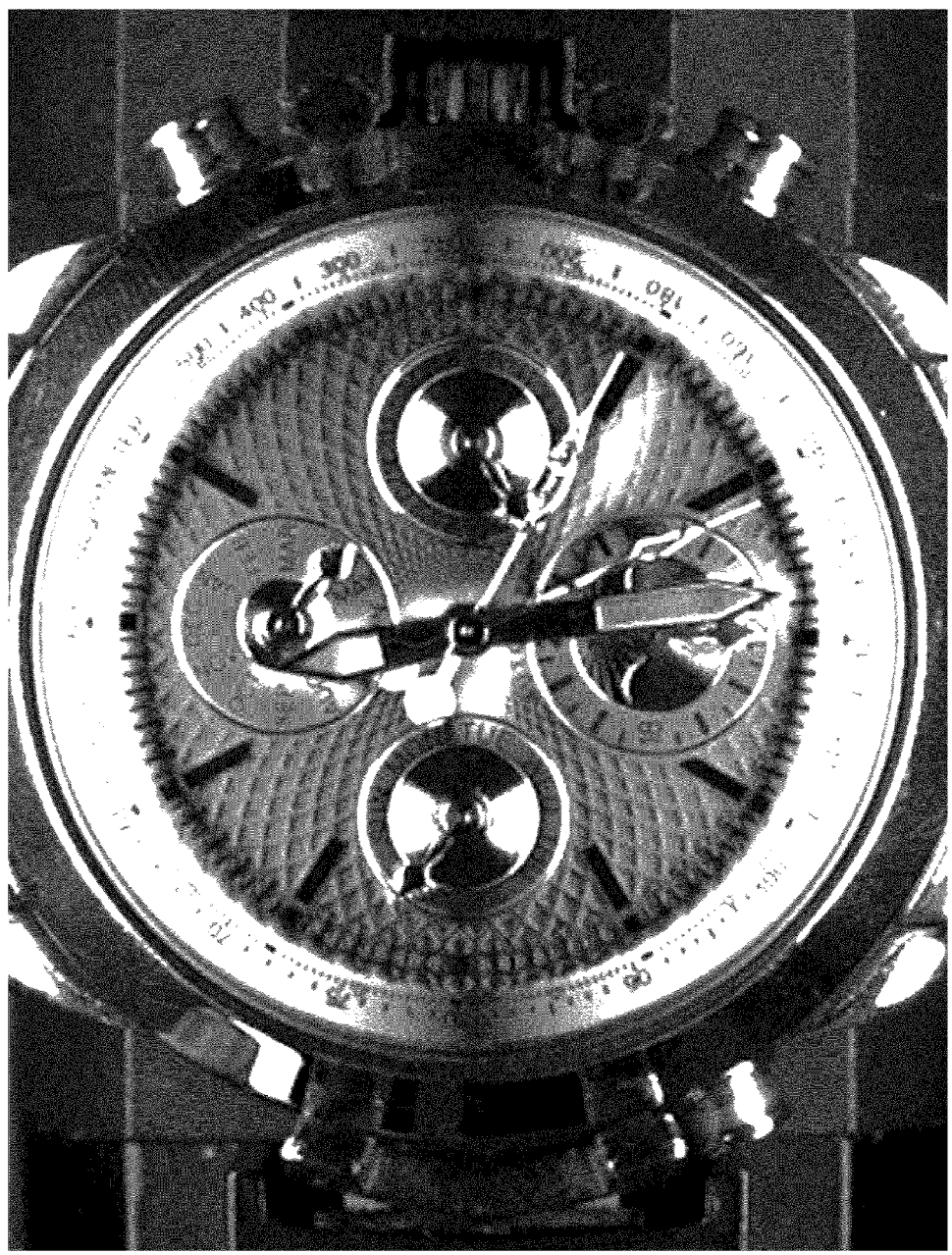
Figure 4C:

The composite image may be created, for example, by subtracting the images shown in FIGS. 3A and 3B to result in the image shown in FIG. 4A, or by subtracting the images shown in FIGS. 3C and 3D to result in the image shown in FIG. 4B. The composite image may be created from a combination of four images, for example by summing the images shown in FIGS. 4A and 4B to result in the image shown in FIG. 4C. Thus, a reference image may be created. A check image may be created in the same way and significant points calculated from each of the composite images and compared.

Each image captured by the camera 19 may have a resolution of 5M pixels (2560×1920 points). There may be 24 bits per pixel. The image may be a RGB image. The field of view may be approximately 63×48 mm, corresponding to an approximate resolution of 25 µm per pixel. The images that are compared may be raw images with, for example, 8 bits per pixel or 12 bits per pixel. The images that are compared may be a monochrome images with for example, 8 bits per pixel or 12 bits per pixel or 16 bits per pixel.

Figure 5A:
Figure 5B:

FIG. 5A shows a reference image of a genuine object and FIG. 5B shows a check image of the object for comparison with the reference image. Note that the configuration of the object in the two images is similar, but not identical, since the position of the object is not identical and some of the mobile parts, in this case the watch hands, have moved. The reference image and the check image were each produced under substantially similar or the same conditions.

Although the following describes comparing the entire of the object that is visible in both images, it is to be understood that the same processing may be applied only to a select portion or portions of the object that is visible in the images. For example, only the central portion of the object or a particular information rich region of the object, such as a logo on the object, could be compared.

The images may be each decomposed into two or more sub-images, which are then processed separately. This would be done, for example, for the purpose of obtaining a more discriminating answer by selecting the most relevant portion or portions of the images, or for the purpose of speed and efficiency when decomposing the images into sub-images and processing them separately.

The images to be compared are processed using a computer to calculate a list of significant points for each image. The list of significant points for the reference image are herein referred to as the reference list and the list of significant points for the check image are herein referred to as the check list. One of the significant points for the reference image is herein referred to as a reference point. One of significant points for the check image is herein referred to as a check point. Each significant point or interest point represents a region of the image, and hence, a part of the object, with distinctive characteristics that make it recognizable under partial degradation of the image which may arise, for example, from noise, distortion, and/or imperfect measurement conditions. A typical example of one such region would be a corner. There may be between 1000 and 20,000 significant points extracted for each image.

Figure 6A:
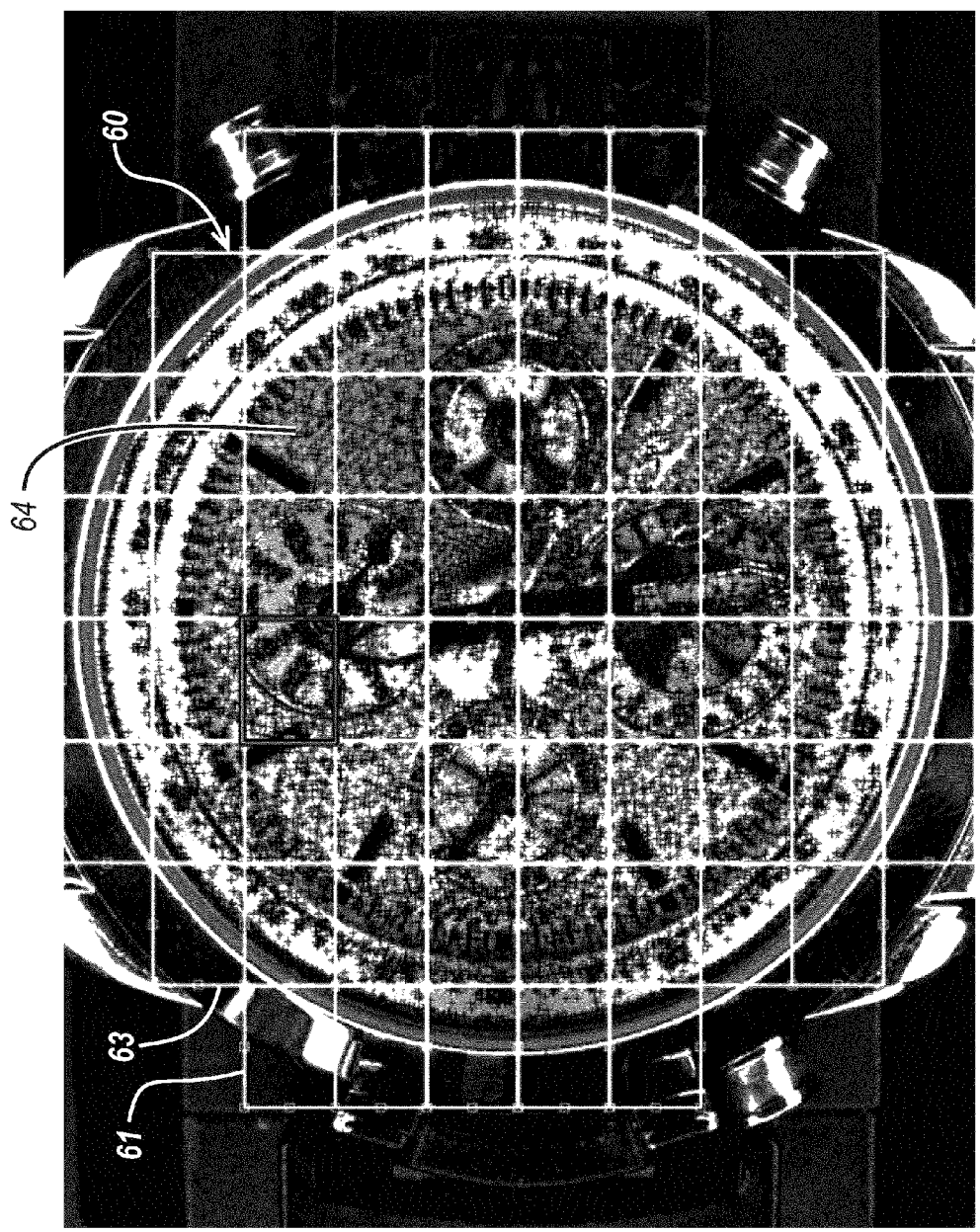
Figure 6B:
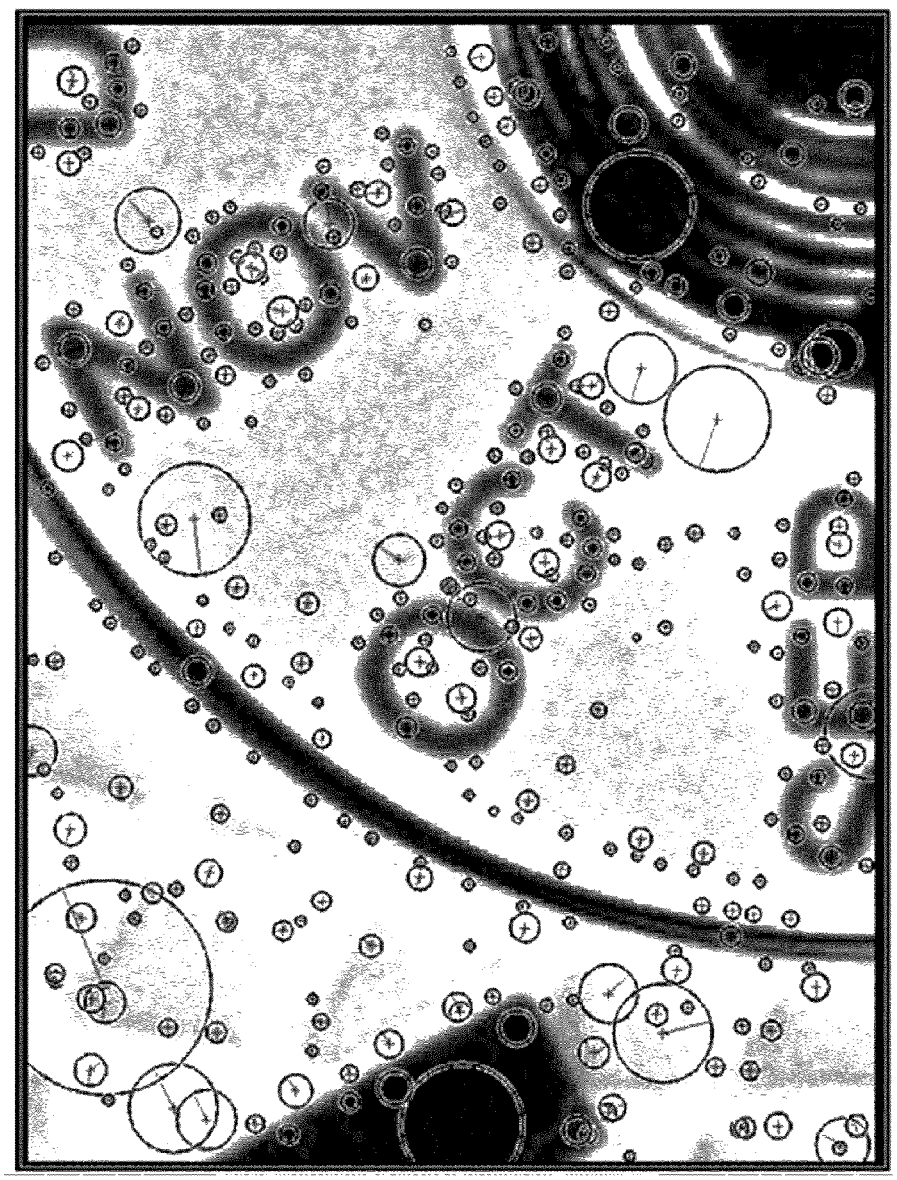

Each significant point may comprise one or more data related to spatial or geometrical features of the corresponding image region, such as coordinates (x, y), radius (r) and orientation (θ), and may comprise a descriptor (D), for example an abstract vector of numbers corresponding to a mathematical description of the corresponding image region. Each descriptor may comprise a number of elements, for example 128. FIGS. 6A and 6B show visual representations of significant points for an object. FIG. 6A shows significant points detected on the whole image, the location of the points being marked with a small black cross, and FIG. 6B is a zoomed in view showing part of the image of FIG. 6A, the points being marked with a circle centered on the point and the length of the radius (r) of the circle showing the size of the corresponding feature and the relative angle of the radius representing the orientation (θ) of the significant point. The location of the center of the point may be expressed in Cartesian co-ordinates.

This kind of significant point is often used in computer vision systems for the purpose of performing image operations, such as image stitching. A number of algorithms have already been developed to detect significant points on an image, such as corner detectors, Harris, features from accelerated segment test (FAST) and difference of Gaussians (DoG), as well as to implement a descriptor for the points, such as patch, speeded up robust features (SURF), scale-invariant feature transform (SIFT), histogram of oriented gradients (HOG), and gradient location and orientation histogram (GLOH).

Figure 7:
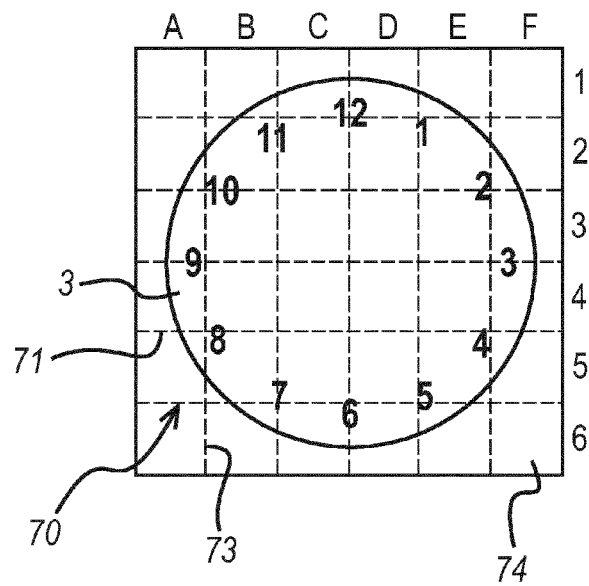
FIG. 7 shows an example of a grid applied to a product.

Having calculated the significant points, the check image is then sub-divided into a number of small sub-regions, for example 100 sub-regions. If there are 100 sub-regions then there may be 50,000 pixels per sub-region. There may be tens or hundreds of significant points per sub-region and there may be up to 1000 significant points for a very dense sub-region. FIG. 7 shows an example of an image that has been divided into 36 sub-regions 74 by applying a grid 70 of dividing horizontal and vertical lines 71, 73 to the image to delineate the sub-regions 74. Sub-regions A1, F1, A6 and F6 will be excluded from analysis since the product 3 is not present in these sub-regions. The check image may be automatically sub-divided into sub-regions depending on the geometry of the product 3 and the level of detail of the images. FIG. 6A also shows an example grid 60, which has dividing horizontal and vertical lines 61, 63 which delineate the sub-regions 64.

Having calculated the significant points for the reference image, it is similarly divided into sub-regions that are comparable in number, size, location on the product, and shape to the sub-regions of the check image. The same size sub-regions may be used for the reference image and the check image.

After the sub-regions are determined, the significant points are then calculated again for each sub-region of the check image and for each sub-region of the reference image. In this example, each significant point comprises coordinates of the significant point (x, y), its radius (r) and orientation (θ), and a descriptor (D).

The significant points are calculated before the sub-regions are determined for the whole image or region of interest of the image up to a certain level of resolution. After the sub-regions are determined, the significant points are calculated again to a finer resolution for each of the sub-regions. This results in a greater number of significant points for each sub-region and the significant points have a smaller radius. It would be possible to calculate the significant points at the finer resolution for the whole image, but dividing the image into sub-images makes it easier to parallelize the calculation, and hence makes the execution faster on a multi-processor system.

The significant points are calculated at a coarser resolution for the whole image before the sub-regions are determined, in order to minimize edge-effects and, because there are less coarse points than fine points, one does not need to parallelize this step.

Since the object is imaged in approximately the same position, is imaged from approximately the same direction and at the same magnification, the portion of the object in one sub region of the check image will approximately correspond to the same portion of the object in a corresponding sub-region of the check image. For example, in FIG. 7 in sub-region B5 of the check-image, a feature of the object 3, reference numeral "8", is present. The same feature will be present in corresponding sub-region B5 of the reference image. Hence, a comparison of corresponding sub-regions allows a comparison of corresponding features of the product in the check image and the product in the reference image.

After the significant points have been determined for the sub-regions of both the reference image and the image to be checked, the matching points between corresponding sub-regions in the two images are determined, wherein the matching points are the ones with the most similar descriptors in corresponding lists of significant points. Matching points may be determined between a given sub-region of the check image and its corresponding sub-region of the reference image and in the neighbouring sub-regions up to a prescribed distance from the border of the sub-regions being compared. This accommodates for the product not being exactly aligned in the check image and the reference image. A pair of matching points is herein referred to as "a match" or "a matching pair." That is, for each point in one list, the most likely match is searched, in terms of similarity of the descriptors to the points in the other list and, optionally in terms of spatial features of the points, such as proximity of the points, similar orientations of the points and/or similar sizes of the points.

Each descriptor may comprise a number of elements, for example 128 elements. A significant point from one list may be considered to match a significant point from another list when their descriptors satisfy a given criterion.

Two descriptors $p=(p_1, p_2, \ldots p_n)$ and $q=(q_1, q_2, \ldots q_n)$ may be considered to match when their distance satisfies a predetermined criterion, wherein $p_1, p_2 \ldots p_n$ represent different elements of the descriptors.

In the following examples, it is assumed that the descriptors are normalized, i.e. that the vectors p, and q, satisfy $\|p\|=\|q\|=1$ Determining whether or not two descriptors match may comprise determining the Euclidean distance of the two descriptor vectors, for example determining the 2-norm function $$d(p,q)=\sqrt{(p_1-q_1)^2+(p_2-q_2)^2+\ldots+(p_n-q_n)^2}=\sqrt{(p-q)\cdot(p-q)}$$

It should be pointed out that for reasons of convenience, such as computational speed, this distance can be calculated as $$d(p,q) = \sqrt{(p-q)\cdot(p-q)} = \sqrt{p\cdot p + q\cdot q - 2p\cdot q} = \sqrt{2[1-(p\cdot q)]}$$

where the last equality holds when p, and q, are normalized. When the angle θ between the two vectors is small, this may be further approximated by $$d(p,q) \approx \sqrt{2[1-\cos(\theta)]} \approx \theta = \arccos(p\cdot q)$$

Other appropriate functions may be used to normalize the descriptors and to calculate their distance, for example, the 1-norm distance $$d(p,q) = |p_1-q_1| + |p_2-q_2| + \ldots |p_n-q_n|$$

or another p-norm distance $$d(p,q) = (|p_1-q_1|^p + |p_2-q_2|^p + \ldots |p_n-q_n|^p)^{1/p} \text{ with } p>1$$

The pre-determined criterion may be an absolute criterion, for example that the distance is smaller than a given value, or a relative criterion, for example that the distance between the descriptor of the reference point and the descriptor of the matching check point is smaller than the distance between the descriptor of the reference point and the descriptor of any other check point, or, for example that the distance between the descriptor of the check point and the descriptor of the matching reference point is smaller than the distance between the descriptor of the check point and the descriptor of any other reference point.

The predetermined criterion may be a combination of an absolute and a relative criterion. Furthermore, when many similar descriptors exist in a list, such as for images containing repetitive patterns, it may be advantageous to restrict the search of matching descriptors to couples of points that are closer in space than a given distance.

Figure 8A:
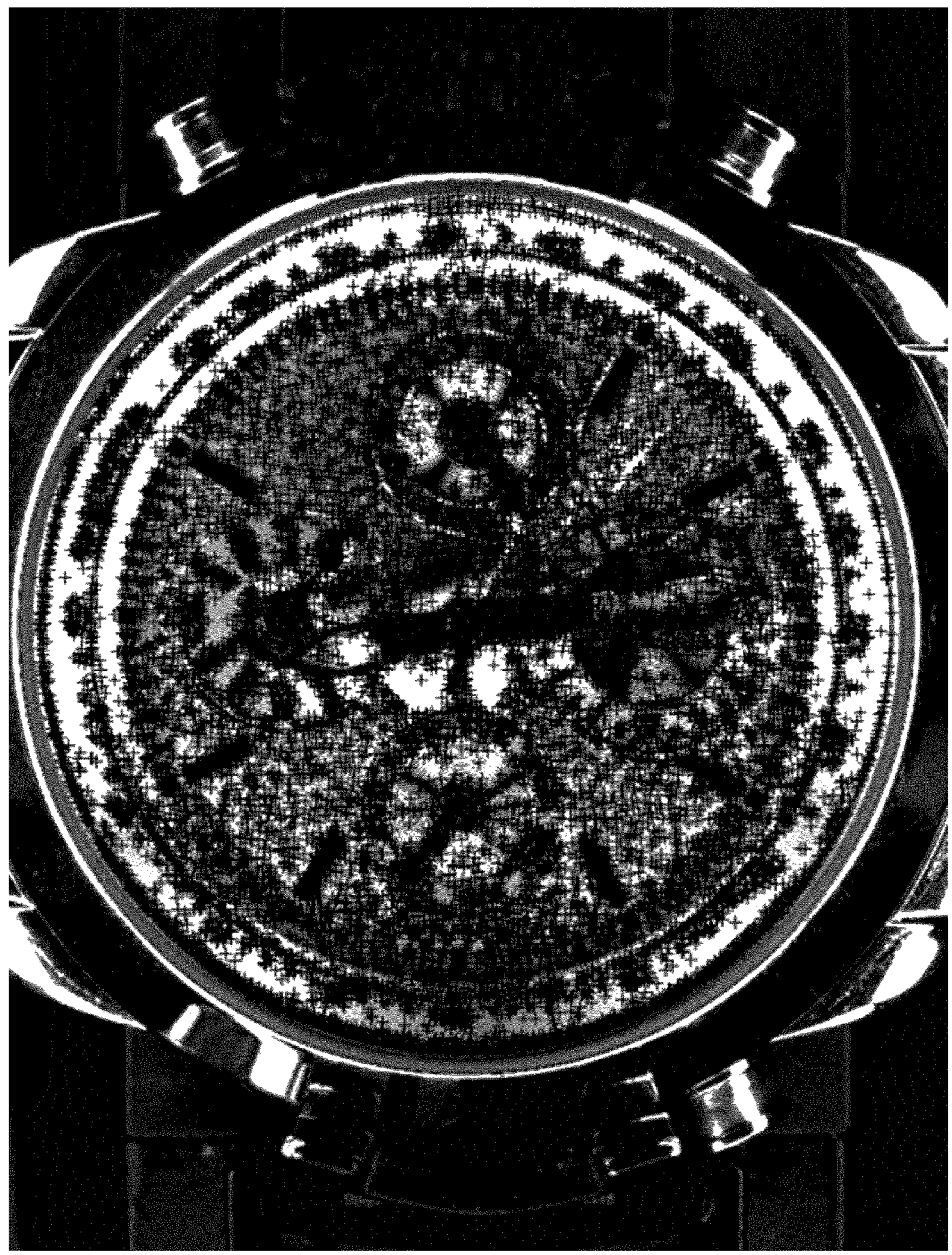
Figure 8B:
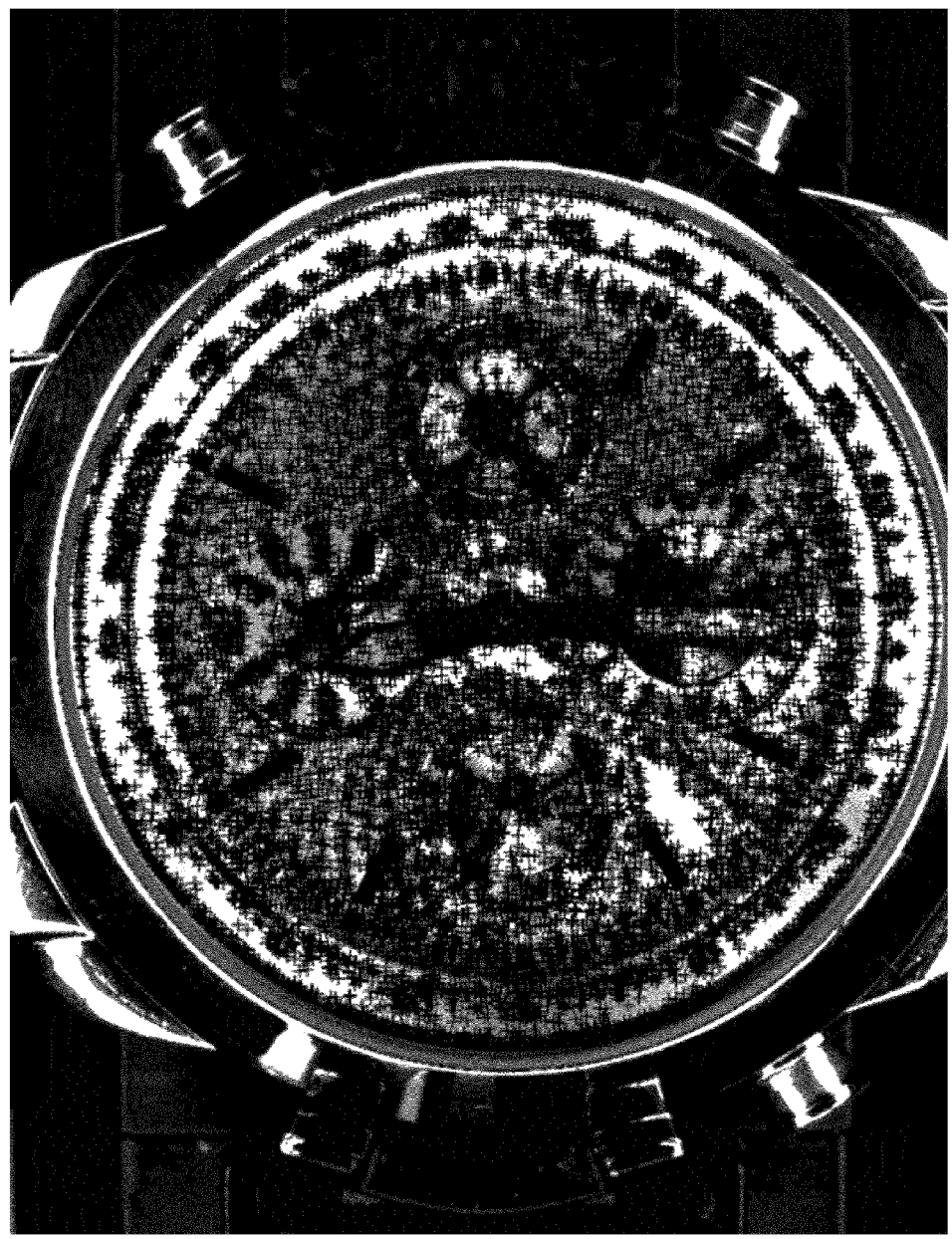
Figure 8C:
Figure 8D:

FIG. 8A shows significant points that have been determined for the reference image, the location of the significant points being marked with a small black cross. FIG. 8B shows significant points determined that have been determined for the check image, which is to be compared with the reference image. FIG. 8C shows the significant points of the reference image that match with significant points of the check image, and FIG. 8D shows the significant points of the check image that match with significant points of the reference image.

The best matching pairs may then be selected and used to determine a common coordinate system for the two images so that the significant points can be compared in a common frame of reference. The best matching pairs may be used to determine a transformation that brings the best matching pairs into as close an alignment as possible. The transformation may then be applied to all of the significant points of the reference image or to all of the significant points of the check image to align the significant points in a common co-ordinate system. There may be, for example, 1000 matching pairs within a sub-region and the best 100 or 150 matches may be selected from these matching pairs to determine the transformation. The transformation may comprise performing a translation and/or a rotation of the coordinates of the reference points and/or of the co-ordinates of the check points, e.g., to account for different positioning of the object in the reference image and in the check image. The transformation may further comprise a more complex operation such as scaling, share and distortions, e.g., to account for differences of perspective in the two images being compared or the different optical distortions of the corresponding imaging systems. Although the object in the two images is approximately aligned, it is not (or may not be) exactly aligned, and comparing the significant points from the two images in the same orientation and perspective improves the comparison of details between the two images.

A transformation matrix may be determined for corresponding sub-regions and applied to all significant points in one of the corresponding sub-regions to rotate and/or translate the co-ordinates of the significant points in the particular sub-region to align as closely as possible with the significant points in the corresponding sub-region. The transform matrix is determined separately for corresponding sub-regions between the two images, rather than for the image as a whole, to improve the alignment and subsequent comparison between corresponding sub-regions of the two images. Alternatively, it would be possible to determine a single transformation matrix for all of the significant points of the image and to process the image in this step as a whole.

An origin and two Cartesian axes may be defined for the common co-ordinate system, wherein the matching significant points have as close as possible the same co-ordinates in the respective reference frame. As an example, the common co-ordinate system may be the one that minimizes the root-mean-square residual distance ($d_{rms}$) between the matching points used to determine the common co-ordinate system. The term root-mean-square, referred to a series of n values, is used here in its conventional sense as the square root of the sum of the square of the residual distances ($d_1, d_2, \ldots, d_n$) between matching points divided by the total number of values (n) which have been squared and summed:

$$d_{rms} = \sqrt{\frac{d_1^2 + d_2^2 + \ldots + d_n^2}{n}}$$

The transform matrix that results in the minimum root-mean-square residual distance between matching points is then applied to all significant points, and not only to the matching pairs, in a sub-region to align them as closely as possible with the significant points in a corresponding sub-region.

Transforming the significant points as opposed to the raw image data results in less data being processed, in accordance with aspects of the disclosure. However, for the purpose of better understanding the disclosure, it is useful to point out that the same transformation that brings the reference points and the check points to a common frame of reference can be used to bring the reference and the check images into alignment, as shown in FIG. 9B, where the transformation has been applied to the coordinates of each individual pixel in the check image shown in FIG. 9A to align the images.

Figure 9A:
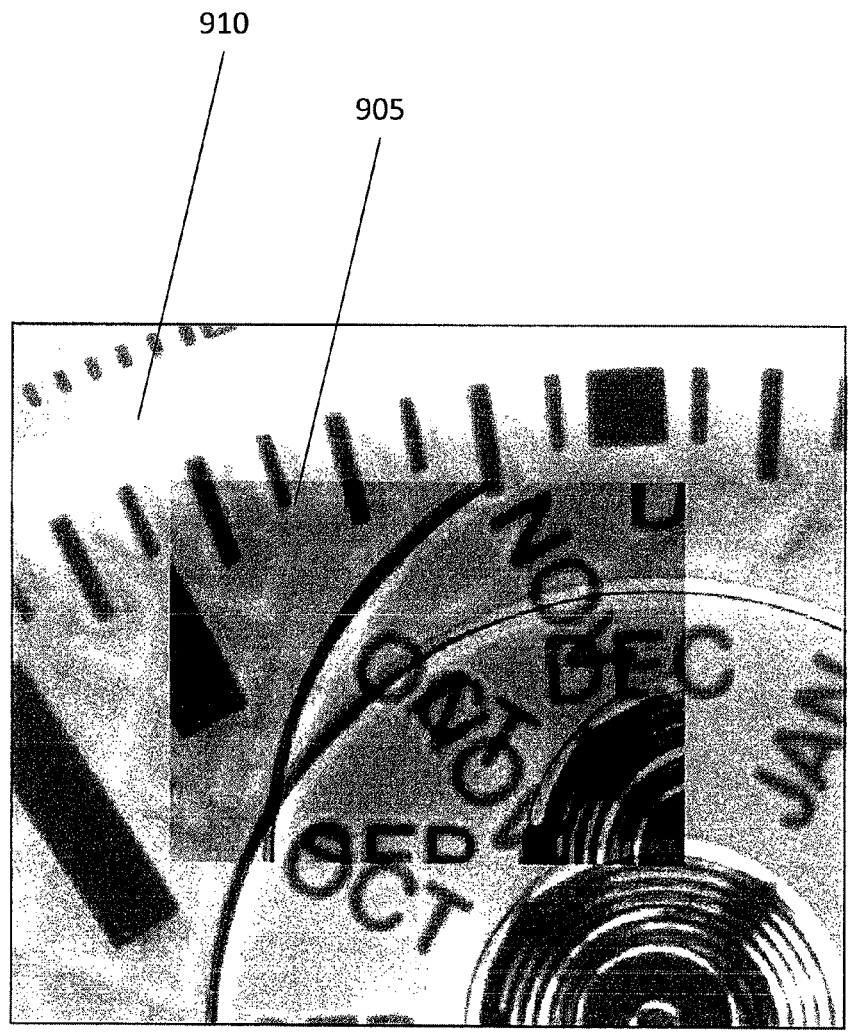
FIG. 9A shows the superposition of two images when the images are not aligned.
Figure 9B:
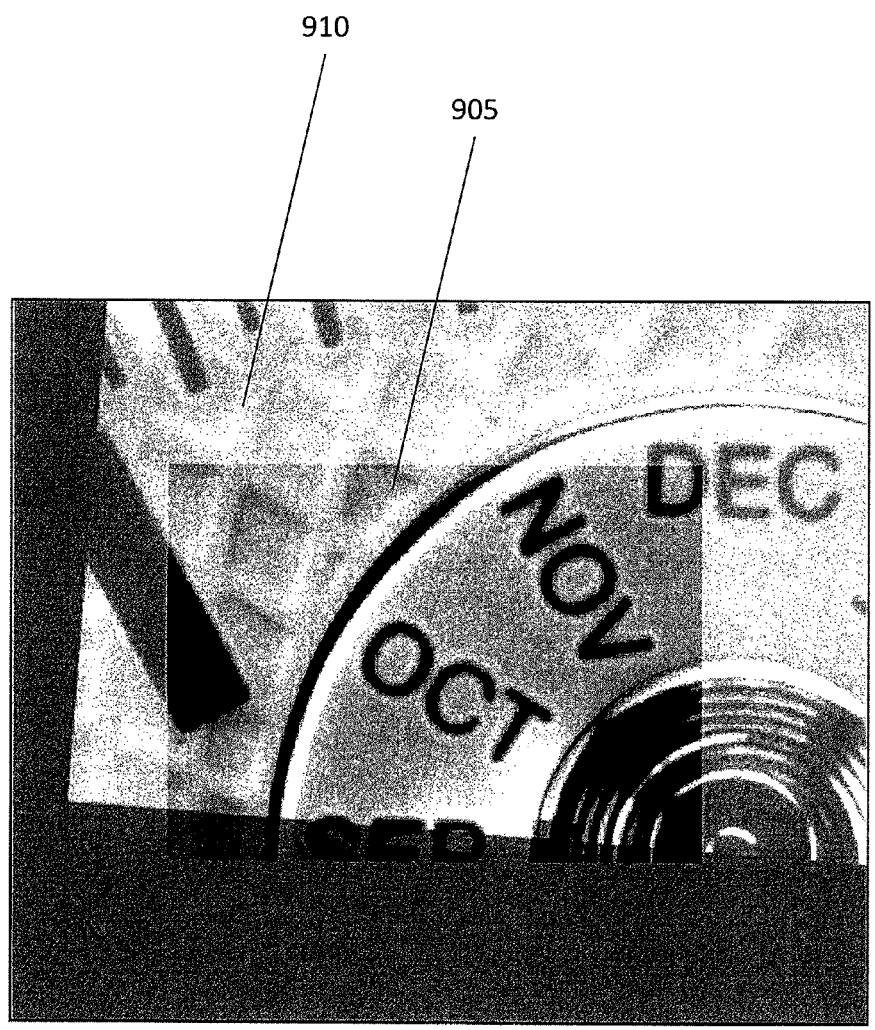
FIG. 9B shows the superposition of two images after they have been aligned through defining a common co-ordinate system.

In other words, FIG. 9A shows the superposition of two images 905, 910 when the images are not aligned, and FIG. 9B shows the superposition of two images 905, 910 after they have been aligned through defining a common co-ordinate system and transforming the check image and the reference image into the common co-ordinate system for example by rotating and translating the check image.

After having referred the significant points to a common co-ordinate system, the significant points in the two lists are then used to establish a degree of correspondence between the two images, and hence, the degree of correspondence of the two objects represented in the images. It can therefore be determined if the two objects are the same, and hence, the authenticity of the object being checked can be determined.

A score (or a function or a merit function) is defined to determine the degree of correspondence between couples of points in the two lists. A predefined threshold is determined, which sets a boundary for determining if the score or output of the function or merit function indicates that the product is authentic. The threshold may vary between products, for example between different models of watches. The threshold may be established by carrying out tests on authentic and unauthentic products of a particular product.

The function is, in one example, the root-mean-square residual distance between the matching pairs in the two lists in the common co-ordinate system. In another example, the function is the root-mean-square residual distance between the matching pairs in the two lists, subject to the constraint that only matching pairs that are closer than a given distance are considered, for example closer than 1 pixel, or closer than 2 pixels, etc.

In another example, the function is the root-mean-square residual distance between each point in the reference list and the point in the check list that is closest to it in space, in other words the nearest neighbouring points. In yet another example, the function is the root-mean-square residual distance between each point in the reference list and the point in the check list that is closest to it in space, in other words the nearest neighbouring points, subject to the constraint that only couples of points that are closer than a given distance are considered, for example closer than 1 pixel, or closer than 2 pixels.

In yet another example, the function is the root-mean-square residual distance between each point in the reference list and the point in the check list that is closest to it in space, in other words the nearest neighbouring points, subject to the constraint that only couples of points whose descriptors have a degree of similarity larger than a prescribed threshold are considered.

In yet another example, the function is defined as the fraction of matching points to the total number of points in the one of the two lists, for example, 300 matching points out of 1000 points in the reference list (30%). If 30% or more of the points match, then the product may be deemed authentic.

A region around each significant point in the check list or each significant point in the reference list may be examined to determine whether or not there is another significant point in its vicinity from the other list of significant points after the significant points from the two lists have been aligned to a common co-ordinate system. This may be performed for each significant point in the check list or in the reference list regardless of whether or not a significant point has been previously deemed to match a point in the other list. For example, for each significant point in the check list or in the reference list, a circular region of a particular radius, for example one pixel or 25 µm, centered on the significant point may be examined to determine if there is a significant point from the other list within this circular region.

Figure 10:
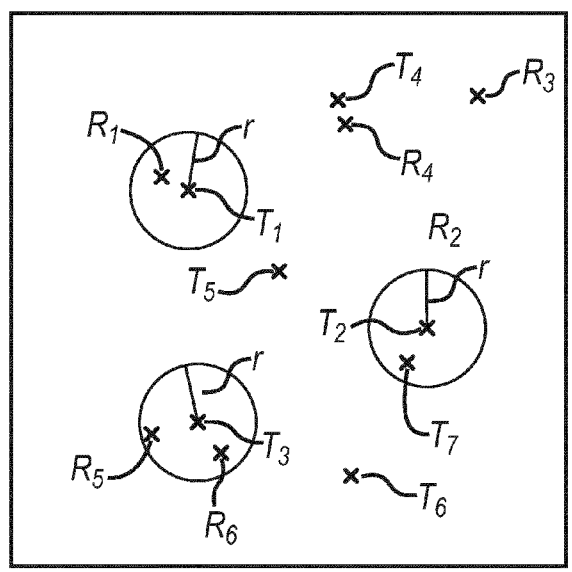
FIG. 10 illustrates comparing the reference significant points and the check significant points after the points have been aligned.

FIG. 10 shows sample significant points of the check image, the centres of which are marked with a cross, and which are indicated by reference numbers $T_1$ to $T_7$. FIG. 10 also shows sample significant points of the reference image, the centres of which are marked with a cross, and which are indicated by reference numbers $R_1$ to $R_6$. The significant points of the check image and the reference image have already been aligned in the common co-ordinate system. For each significant point in the check image, $T_1$ to $T_7$, a radius (r) around each point is considered, to determine whether or not there is a significant point from the reference image within that radius. For point $T_1$, there is a significant point, $R_1$, within the radius (r). For point $T_2$, there are no significant points from the reference image within the radius (r). For point $T_3$, there are a plurality of significant points, $R_5$ and $R_6$, within the radius (r). Having considered a radius (r) around each of the significant points of the check image $T_1$ to $T_7$, the total number of significant points of the check image which have one or more significant points within a radius (r) of a point is determined. This calculation may be performed separately for each of the sub-regions. The results may then combined to determine a ratio of the total number of significant points of the of the check image which have one or more significant points within the radius (r) to: (a) the total number of significant points of the check image; or (b) the total number of significant points of the reference image for the compared images or for a region of interest of the compared images. The ratio (a) or (b) may be selected based on whichever of the two lists of significant points is shorter. This ratio is used to determine whether or not the two products are the same. If the two products are the same, then the ratio will be higher. If the two products are not the same, then the ratio will be lower. The exact threshold value of the ratio for determining the authenticity of the product will vary depending on the exact nature of the product being compared.

For one particular model, comparing the check image of the watch with the reference image of the same individual watch it has been found that the threshold value of the ratio will be around 20%. For another model it has been found that the threshold value of the ratio will be 40%. For yet another individual watch, the threshold value is 50%. When two different genuine watches of the same model are compared, the ratio or percentage is significantly lower than the threshold value, for example between 5 and 10%. For a counterfeit watch and a genuine watch of the same intended model, the ratio may be only 1 to 2%. The threshold value for determining the authenticity of the product will vary between products. It will depend on the complexity of the imaged details of the product. The threshold values for each product will need to be calibrated and determined for a particular model.

Figure 11A:
Figure 11B:
Figure 11C:
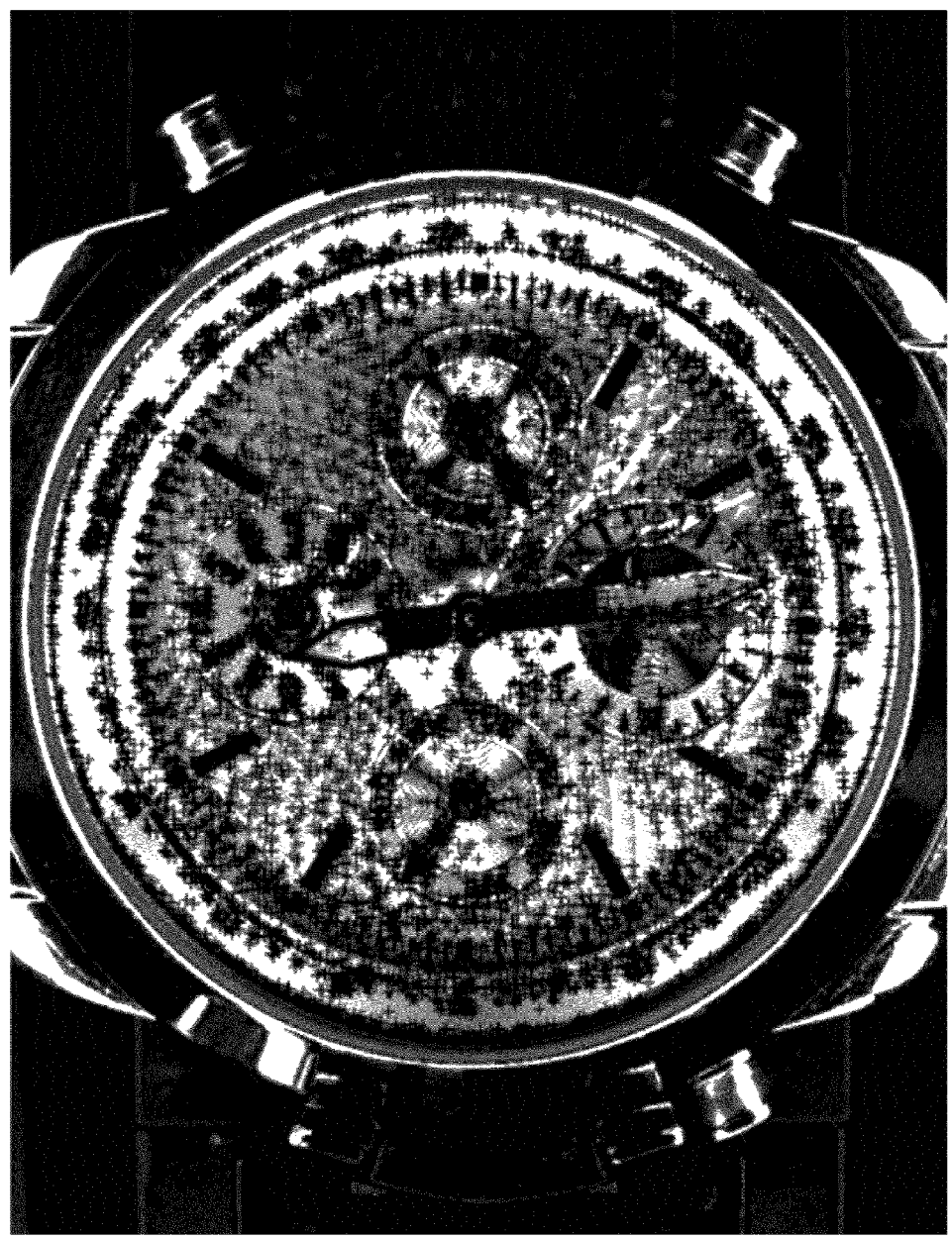
Figure 11D:
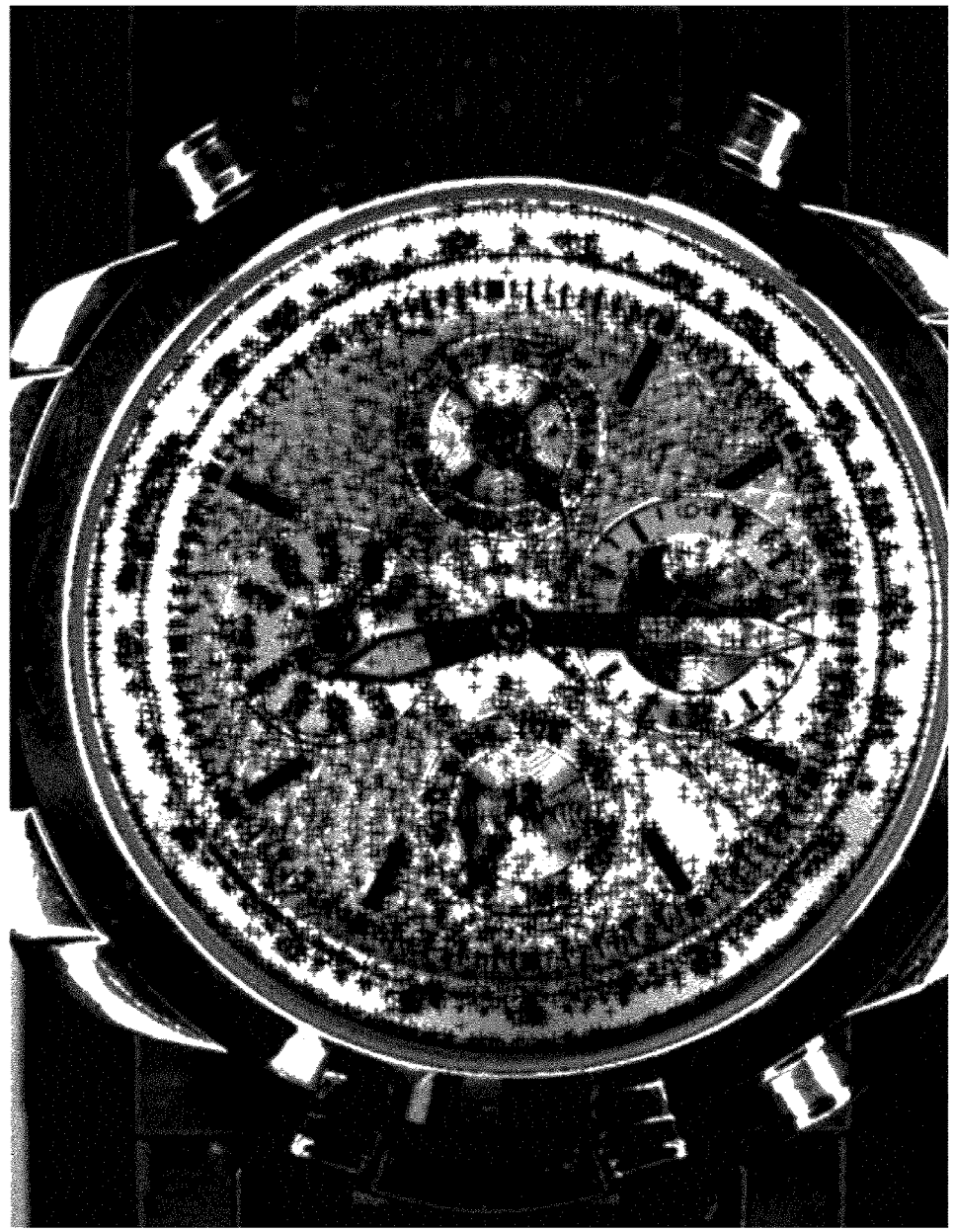
Figure 12B:
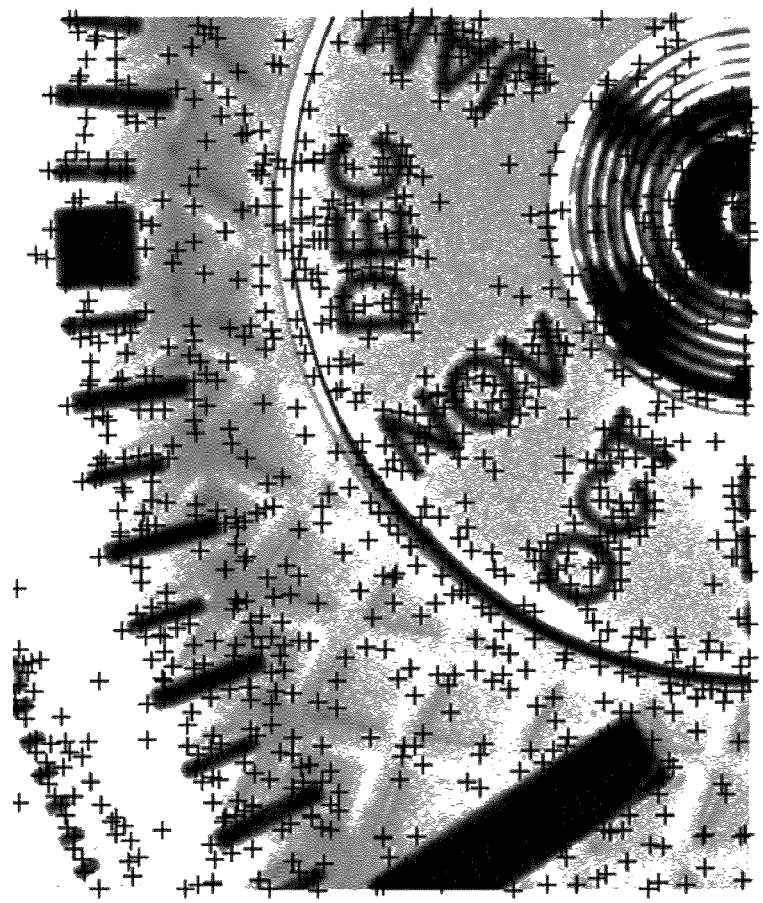
Figure 12A:
Figure 12D:
Figure 12C:

FIGS. 11A to 11D show significant points and significant points that are closer than two pixels for a reference image and for a check image to be compared with the reference image after the significant points have been referred to a common co-ordinate system. FIG. 11A illustrates the significant points determined for the reference image and FIG. 11B illustrates the significant points determined for the check image. FIG. 11C shows the significant points of the reference image that are closer than two pixels to a significant point of the check image in the common co-ordinate system. In FIGS. 11C and 11D, all points are retained that are closer than two pixels, regardless of their descriptor. FIG. 11D shows the significant points of the check image that are closer than two pixels to a significant point of the reference image in the common co-ordinate system. FIG. 12A to 12D illustrate zoomed-in versions of part of the images shown in FIGS. 11A to 11D, respectively, to illustrate the comparison process.

It is clear that the above-mentioned examples are not meant to be exhaustive, and that other functions can be used, including functions that combine two or more of the above-mentioned criteria.

Based on the function, an answer is output by the computer and conveyed to a user concerning the degree of correspondence between the two images, and hence, the degree of correspondence of the two objects represented in the images. This answer may the output of the function itself, or it may be a simple yes/no if the function is above/below a prescribed value, or it could be a more complex answer, for example conveying the ratio and the rms distance between matching points.

The answer may be calculated locally to the imaging apparatus 2 and sent to a verification station, which may be the central server. The answer may be calculated at a remote server and conveyed to a user local to the imaging apparatus 2.

It may be necessary or desirable to capture an image of the genuine product as a new reference image against which later check images can be compared. For example, if a product is repaired, then details of the product may change slightly. After the repair, the product can be imaged using the imaging apparatus 2, and the image data stored as a reference for authenticating the product at a later date. It is especially helpful to store the raw image data so that analyses can be performed on the data at a later date.

The invention claimed is:

1. A method of authenticating a product, comprising:
    capturing an image of a product to be authenticated;
    determining a plurality of significant points of the captured image;
    comparing the plurality of significant points of the captured image of the product to be authenticated with a plurality of significant points of a previously captured reference image of a genuine product, wherein the product to be authenticated and the genuine product are located in a substantially similar position in the images from which the significant points are calculated;
    aligning a plurality of said significant points of the image of the product to be authenticated with a plurality of said significant points of the image of the genuine product prior to comparing the significant points, wherein comparing the plurality of significant points of the image of the product to be authenticated with the plurality of significant points of the image of the genuine product comprises determining if a significant point of the plurality of significant points of the image of the product to be authenticated is within a defined distance of a significant point of the plurality of significant points of the image of the genuine product; and
    determining a total number of significant points of the image of the product to be authenticated that are within said defined distance of a significant point of the image of the genuine product within a region of the image.

2. The method of claim 1, wherein aligning the significant points comprises:
    determining two or more matching pairs between the plurality of significant points of the image of the product to be authenticated and the plurality of significant points of the image of the genuine product; and
    determining a transformation for aligning the significant points using the two or more matching pairs.

3. The method of claim 2, wherein each of the significant points of the image of the product to be authenticated and the significant points of the image of the genuine product comprises a descriptor, and wherein determining two or more matching pairs comprises comparing the descriptors of the plurality of significant points of the image of the product to be authenticated and the plurality of significant points of the image of the genuine product.

4. The method of claim 2, further comprising dividing the image of the product to be authenticated into a plurality of sub-regions, and aligning the plurality of significant points of the image of the product to be authenticated and the plurality of significant points of the reference image of the genuine product separately for the sub-regions.

5. The method of claim 4, comprising determining a plurality of significant points of the image of the product to be authenticated prior to determining the sub-regions for assisting in a determination of the sub-regions.

6. The method of claim 1, wherein comparing the plurality of significant points of the image of the product to be authenticated with the plurality of significant points of the image of the genuine product comprises determining if a significant point of the plurality of significant points of the image of the product to be authenticated is within a defined distance of a significant point of the plurality of significant points of the image of the genuine product for at least some of the significant points of the image of the product to be authenticated or for at least some of the significant points of the image of the genuine product within a region of the image.

7. The method of claim 6, further comprising applying a function to the total number to determine an output for comparison with a threshold value to determine the authenticity of the product.

8. The method of claim 7, wherein the function comprises dividing the total number by the total number of significant points of the image of the product to be authenticated within the region of the image or by the total number of significant points of the image of the genuine product within the region of the image to determine a ratio.

9. The method of claim 1, wherein the product is a timepiece.

10. The method of claim 1, wherein the captured image is a first image, and the method further comprising capturing a second image of the product for creating a composite image based on the first image and the second image for comparison with a reference image of a genuine product for authenticating the product.

11. The method of claim 10, wherein the capturing the first image of the product is carried out when the product is illuminated from a first direction and wherein the capturing the second image of the product is carried out when the product is illuminated from a second direction, wherein the second direction is different from the first direction.

12. The method of claim 10, wherein the capturing the first image is carried out at a first exposure time, and wherein the capturing the second image is carried out at a second exposure time, wherein the first exposure time is different from the second exposure time.

13. The method of claim 10, further comprising receiving imaging instructions comprising the conditions for capturing the image or images of the product to be authenticated, and capturing the image or images of the product according to the imaging instructions.

14. The method of claim 13, wherein the imaging instructions convey substantially similar or the same conditions under which the reference image or images of a genuine product were captured at an earlier point in time so that the product to be authenticated can be imaged under substantially similar or the same conditions as the genuine product.

* * * * *